United States Patent [19]

Sansone

[11] Patent Number: 4,868,249
[45] Date of Patent: Sep. 19, 1989

[54] CYANOETHYLATION OF HYDROXYETHYLATED POLYBENZIMIDAZOLE POLYMERS

[75] Inventor: Michael J. Sansone, Berkeley Heights, N.J.

[73] Assignee: Hoechst Celanese Corp., Somerville, N.J.

[21] Appl. No.: 135,774

[22] Filed: Dec. 21, 1987

[51] Int. Cl.⁴ .............................................. C08G 69/26
[52] U.S. Cl. .................................. 525/426; 525/433; 525/435; 528/331; 528/342
[58] Field of Search ....................... 525/426, 433, 435; 528/331, 342

[56] References Cited

U.S. PATENT DOCUMENTS 4,734,466  3/1988  Kindler et al. ...................... 525/433

Primary Examiner—Harold D. Anderson
Attorney, Agent, or Firm—Lynch, Cox, Gilman & Mahan

[57] ABSTRACT

A process for producing cyanoethyl derivatives of hydroxyethylated polybenzimidazole is provided. The process comprises the steps of preparing an hydroxyethylated polybenzimidazole solution, mixing with that solution a base with a pka of at least 9 to form an hydroxyethylated polybenzimidazole anion and reacting the anion with acrylonitrile to produce a cyanoethyl derivative of the hydroxyethylated polybenzimidazole polymer. The derivative can be formed into ultrafilters, ion exchange membranes and for other such separatory articles.

25 Claims, No Drawings

4,868,249

CYANOETHYLATION OF HYDROXYETHYLATED POLYBENZIMIDAZOLE POLYMERS

BACKGROUND OF INVENTION

1. Field of Invention

This invention relates to substituted polybenzimidazole products and a process for their production. More particularly, this invention relates to cynoethyl derivatives of hydroxyethylated polybenzimidazole polymers and a process for their production.

2. Prior Art

Polybenzimidazoles are a known class of heterocylic polymers which are characterized by a high degree of thermal and chemical stability. Processes for their production are disclosed in U.S. Pat. No. Re. 26,065, and U.S. Pat. Nos. 3,313,783, 3,509,108, 3,555,389, 3,433,772, 3,408,336, 3,549,603, 3,708,439, 4,154,919 and 4,312,976 (all patents are herein incorporated by reference). Polybenzimidazole polymers have been formed into membranes, ultrafilters, reverse osmosis devices and other types of separatory media of great utility.

While polybenzimidazole polymers are generally chemically resistant, reaction at the imidazole nitrogen-hydrogen bond will occur under certain conditions. One method of limiting the reactivity of polybenzimidazole polymers is to chemically modify the polymer. For example, U.S. Pat. Nos. 4,020,142 and 4,154,919, disclose polyenzimidazole polymers which have been crosslinked to remove the reactive nitrogen-hydrogen bond on the imidazole ring.

In another effort to reduce the chemical reactivity of polybenzimidazole polymers, the hydrogen bonded to the the imidazole nitrogen has been replaced by various less reactant substituents. For example, U.S. Pat. No. 3,578,644 discloses an hydroxyl substitution onto the polybenzimidazole polymer by the reaction of an omega-halo-alkanol or 1,2-alkylene oxide with the polybenzimidazole polymer. See also, U.S. Pat. No. 4,599,388 which discloses a different process for the production of hydroxyl substituted polybenzimidazole polymers. However, neither of these patents disclose substituted hydroxyethylated polybenzimidazole polymers, in general, or cyanoethyl-substituted hydroxyethylated polybenzimidazole polymers, in particular.

U.S. Pat. No. 3,943,125 discloses various substituted polybenzimidazole polymers produced by the reaction of substituted tetramino pyridines or their acid salts with a suitable acid halide or dianhydride. While the patent broadly discloses a large number of substituted tetramino compounds, it fails to disclose the process for their preparation. It also specifically fails to disclose cyanoethyl-substituted hydroxyethylated polybenzimidazole polymers or a process for its production.

In addition, other substituted polybenzimidazole polymers are disclosed in U.S. Pat. Nos. 3,518,234 and 4,377,546. However, neither patent discloses cyanoethyl-substituted hydroxyethylated polybenzimidazole polymers.

It is therefore an object of this invention to produce novel substituted hydroxyethylated polybenzimidazole polymers.

It is another object of this invention to produce substituted hydroxyethylated polybenzimidazole polymers which exhibit a high degree of resistance to chemical attack and which are stable at high temperatures.

It is an additional object of this invention to produce a cyanoethyl hydroxyethylated polybenzimidazole polymer using an hydroxyethylated polybenzimidazole polymer as the precursor polymer.

It is a further object of this invention to produce cyanoethyl hydroxyethylated polybenzimidazole polymers wherein the cyanoethylation substitution is substantially complete.

These and other objects as well as the scope, nature, and utilization of this invention will be apparent to those skilled in the art from the following detailed description and appended claims.

SUMMARY OF INVENTION

The present invention involves a process for the production of cyanoethyl hydroxyethylated polybenzimidazole polymers as follows:

a. preparing an hydroxyethylated polybenzimidazole polymer solvent solution;

b. mixing with the solution a base to form an hydroxyethylated polybenzimidazole anion; and c. reacting the hydroxyethylated polybenzimidazole anion with an acrylonitrile to produce a cyanoethyl hydroxyethylated polybenzimidazole polymer.

The cyanoethyl substituted hydroxyethylated polybenzimidazole polymer produced by this process can be formed into films, fibers and other such products similar to those produced from unsubstituted polybenzimidazole polymers. However, because these polymers are substantially substituted, articles produced from them are highly resistant to chemical reaction. Reverse osmosis and ultra filtration membranes prepared from these polymers show improved performance characteristics over unsubstituted polybenzimidazole polymer membranes.

DETAILED DESCRIPTION OF INVENTION

A. The Polybenzimidazole Starting Polymer

Polybenzimidazoles are a known class of heterocylic polymers which are characterized by a recurring monomeric unit which corresponds to the following Formulas I or II. Formula I is:

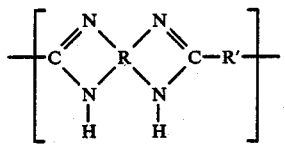

where R is a tetravalent aromatic nucleus with the nitrogen atoms forming the imidazole rings being paired upon adjacent carbon atoms, i.e., ortho carbon atoms, of the aromatic nucleus, and R' is a divalent substitutent selected from aliphatic, alicyclic and aromatic radicals. Illustrative of R' substitutents are divalent organic radicals containing between about 2–20 carbon atoms, such as ethylene, propylene, butylene, cyclohexylene, phenylene, pyridine, pyrazine, furan, thiophene, pyran, and the like.

Formula II corresponds to the structure:

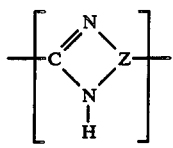

where Z is an aromatic nucleus having the nitrogen atoms forming the imidazole ring paired upon adjacent carbon atoms of the aromatic nucleus.

the above illustrated polybenzimidazole can be prepared by various known processes, as described in the Background of Invention section.

The following generalized equation illustrates the condensation reaction which occurs in forming the polybenzimidazole having the recurring units of Formula I.

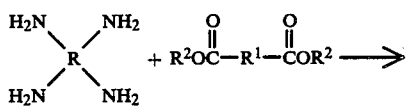

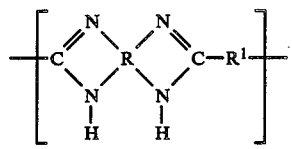

Such polybenzimidazoles are produced by the reaction of a mixture of (1) at least one aromatic tetraamine containing two groups of amine substituents, the amine substituents in each group being in an ortho position relative to each other, and (2) at least one dicarboxylate ester in which $R^1$ and $R_2$ in the compounds shown are substituents selected from aliphatic, alicyclic and aromatic groups.

Examples of polybenzimidazole which have the recurring structure of Formula I include:

poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene-4",4")-5,5'-bibenzimidazole;
poly-2,2'-amylene-5,5'-bibenzimidazole;
poly-2,2'-octamethylene-5,5'-bibenzimidazole;
poly-2,2'-(m-phenylene)-5,5'-diimidazobenzene;
poly-2,2'-(m-phenylene)-5,5'-di(bibenzimidazole)ether;
poly-2,2'-(m-phenylene)-5,5'-di(bibenzimidazole)sulfide;
poly-2,2'-(m-phenylene)-5,5'-di(bibenzimidazole)sulfone;
poly-2,2'-(m-phenylene)-5,5'-di(bibenzimidazole)methane;
poly-2,2"'-(m-phenylene)-5,5"'-di(benzimidazole)-propane-2,2; and
poly-2,2'-(m-phenylene)-5,5"'-di(benzimidazole)-ethylene-1,2.

The preferred polybenzimidazole of Formula I is poly-2,2'-(m-phenylene)-5,5'-bibenzimidazole as characterized by the recurring monomeric unit:

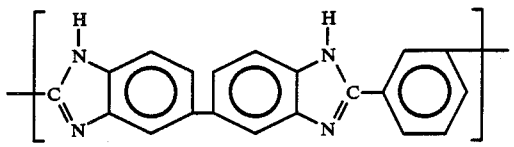

The polybenzimidazole having the recurring monomer unit of Formula II can be prepared by the autocondensation of at least one aromatic compound having a pair of amine substituents in an ortho position relative to each other and carboxylate ester group positioned upon an aromatic nucleus. Examples of such compounds are esters of diaminocarboxylic acids which include 3,4-diaminonaphthalene acid; 5,6-diaminonaphthalene-1-carboxylic acid; 5,6-diamino-napthalene-2-carboxylic acid; 6,7-diaminonaphthalene-1-carboxylic acid;, and the like. A preferred compound is 4-phenoxycarbonyl-3',4'-diaminodiphenyl ether. The polymer obtained with 4-phenoxycarbonyl-3',4'-diaminodiphenyl ether is poly-5-(4-phenyleneoxy)benzimidazole.

The polybenzimidazole starting material for the present invention process typically will exhibit an inherent viscosity between about 0.1–1.0 dl/g when measured at a concentration of 0.4 g of said polybenzimidazole in 100 ml of 97 percent sulfuric acid at 25° C.

The weight average molecular weight of a typical polybenzimidazole starting material will be in the range between about 1000–100,000.

B. The Carbonate Reaction

The above polybenzimidazole polymer is reacted with an ethylene carbonate in an organic solvent medium to produce the desired hydroxyethylated polybenzimidazole polymer starting material.

The ethylene carbonate reactant can be employed essentially in any molar quantity with respect to the polybenzimidazole starting material to produce various percentages of substitution. Preferably, the ethylene carbonate reactant is employed in at least a stoichiometric quantity with respect to the reactive imidazole hydrogen sites on the polybenzimidazole polymer. In a preferred embodiment, the ratio of each ethylene carbonate molecule to each reactive imidazole group is from about 2 to about 20 to 1. It is desirable to achieve at least about a 10 percent substitution of the reactive imidazole hydrogen sites with hydroxyethyl groups and in a preferred embodiment at least about 40 percent substitution.

The concentration of the polybenzimidazole polymer and ethylene carbonate reactants in the organic solvent reaction medium is limited only by the solubility of the polybenzimidazole polymer in the solvent. The molecular weight of the polybenzimidazole polymer is a factor in determining the maximum solute weight of the polymer in the organic solvent reaction medium. Generally, the polybenzimidazole polymer concentration in the organic solvent medium will be in the range between about 1 and about 30 percent by weight, based on the total weight of the reaction solution. In a preferred embodiment polybenzimidazole polymer dopes of about 15 to about 25 percent based on the total solution weight are used.

The hydroxyethylation reaction between the ethylene carbonate and the polybenzimidazole polymer typically is conducted at a temperature between about 30°

C. and about 225° C. for a reaction period between about 0.5–24 hours. The reaction can be accomplished conveniently at ambient pressures. In a preferred embodiment the reaction occurs at about 145° C. to about 210° C. over about a 3 to about a 5 hour reaction period.

Organic solvents suitable for purposes of the present invention include N,N-dimethylformamide, N,N-dimethylacetamide, dimethylsulfoxide, N-methyl-2-pyrrolidone, and the like, with N,N-dimethylacetamide the preferred solvent.

When unsubstituted ethylene carbonate is used as a reactant, the substituted polybenzimidazole produced is hydroxyethylated polybenzimidazole according to the following reaction scheme:

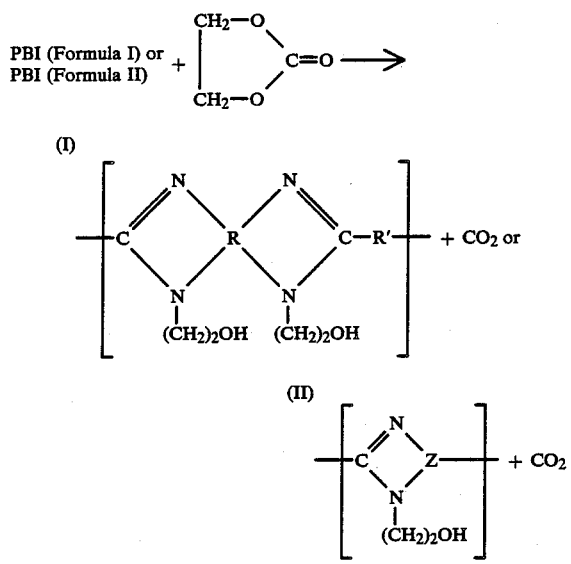

The Formula (I) and Formula (II) repeating units correspond to the Formula I and Formula II polybenzimidazole structures as previously defined.

After the reaction process is completed, the hydroxyethyl substituted polybenzimidazole can be recovered by any conventional procedures, such as by vacuum distillation of the solvent medium, to produce a residual polymeric solid, or by precipitation of the polymer from the solvent medium by addition of a non-solvent such as methanol or hexane. The substituted polybenzimidazole polymer of the present invention can be cast molded into membranes or spun in fibers.

C. The Hydroxyethylated Polymer Solution

The solvents utilized to form the hydroxyethylated polybenzimidazole polymer solution useful herein include those solvents which are commonly recognized as being capable of dissolving typical polybenzimidazole polymers. For instance, the solvents may be selected from those commonly utilized in the formation of polybenzimidazole dry spinning solutions including N,N-dimethylacetamide, N,N-dimethylformamide, dimethylsulfoxide, and N-methyl-2-pyrrolidone, with N-methyl-2-pyrrolidone the preferred solvent. Additional representative solvents include formic acid, acetic acid, and sulfuric acid.

The polymer solution may be prepared, for example, by dissolving sufficient hydroxyethylated polybenzimidazole polymer in the solvent to yield a final solution containing from about 1 to about 35 percent by weight of the polymer based on the total weight of the solution. When the solution contains concentrations of hydroxyethylated polybenzimidazole polymer less than about 5 percent, the substitutions obtained are less than optimum. When concentrations of hydroxyethylated polybenzimidazole polymer approach about 35 percent, the hydroxyethylated polybenzimidazole polymer solution must be heated to complete the subsequent reaction with the acrylonitrile. Therefore, it is preferred that the concentration of hydroxyethylated polybenzimidazole in solution ranges from about 5 to about 20 percent by weight. The quantity of hydroxyethylated polybenzimidazole dissolved in the solvent should be such that the resulting solution has a viscosity of about 50 to 4,000 poise at 30° C., and preferably from about 400 to about 600 poises.

One suitable means for dissolving the polymer in the solvent is by mixing the materials at a temperatures above the normal boiling point of the solvent, for example, about 25° C. to about 120° C. above such boiling point, and at a pressure of about 2 to about 15 atmospheres for a period of about 1 to about 5 hours under constant stirring. The resulting solutions are preferably filtered to remove any undissolved polymer.

D. The Base Reaction

To the hydroxyethylated polybenzimidazole solution prepared above is added a base to create an hydroxyethylated polybenzimidazole anion. The base can be any organic or inorganic base of sufficient strength (a pka of at least about 9) to generate the hydroxyethylated polybenzimidazole anion. Although, inorganic bases such as sodium hydroxide or potassium hydroxide, may be used, organic bases are preferred, since they will generally mix easier with the hydroxyethylated polybenzimidazole solvent solution. Where an inorganic base is used, however, it is slurried at the bottom of the reaction vessel to generate the hydroxyethylated polybenzimidazole anion.

In a preferred embodiment the suitable organic bases include hydrides, alkoxides, organometallic bases, amides, quaternary ammonium hydroxides or other well-known organic bases. In a more preferred embodiment, the suitable organic bases include lithium hydride, benzyl trimethyl ammonium hydroxide, sodium methoxide, sodium amide, butyl lithium, Grignard reagents or other similar organic bases having a pka of at least 9.

A sufficient quantity of the base should be added to the solution to convert the desired percentage of the hydroxyethylated polybenzimidazole polymer into a hydroxyethylated polybenzimidazole anion. To convert at least about 15 percent of the hydroxyethylated polybenzimidazole polymer into hydroxyethylated polybenzimidazole anions, about 1 to about 15 percent by weight based on the total solution weight of the base, should be reacted with the polymer. In a preferred embodiment, from about 1 to about 8 percent of the base by weight based on the total solution weight should be reacted with the polymer.

The reaction produces an hydroxyethylated polybenzimidazole anion by the following reaction scheme, when using the hydroxyethylated polybenzimidazole polymer produced from the polybenzimidazole polymer as previously disclosed:

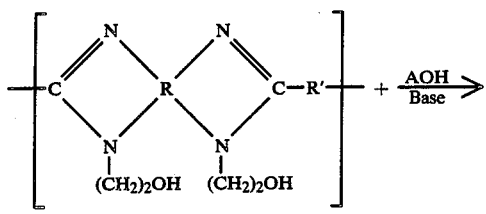

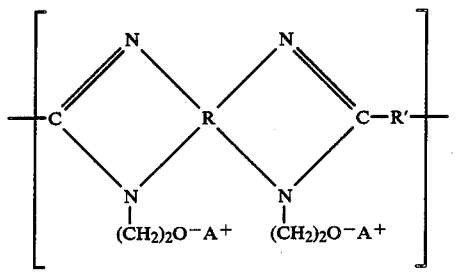

wherein AOH is an organic base as previously disclosed.

The hydroxyethylated polybenzimidazole polymer is rapidly converted to the hydroxyethylated polybenzimidazole polymer anion at room temperature in the presence of the appropriate base. In a preferred embodiment, the organic base is mixed with the hydroxyethylated polybenzimidazole polymer in solution for about 1 to 3 hours. To expedite the reaction, the solution may be heated to a temperature of about 50° C. to about 150° C.

D. The Acrylonitrile Reaction

To the solution containing the hydroxyethylated polybenzimidazole anion is added an acrylonitrile to generate the cyanoethyl hydroxyethylated polybenzimidazole polymer. The hydroxyethylated polybenzimidazole anion generated by the prior reaction acts as a nucleophilic agent to attach the conjugated bond of acrylonitrile. The reaction scheme when using an unsubstituted acrylonitrile and the hydroxyethylated polybenzimidazole polymer shown in the prior reaction is as follows:

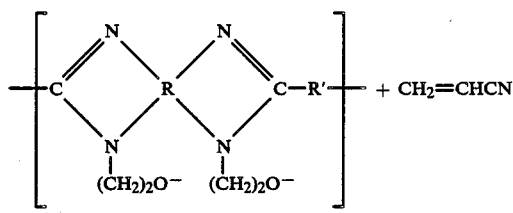

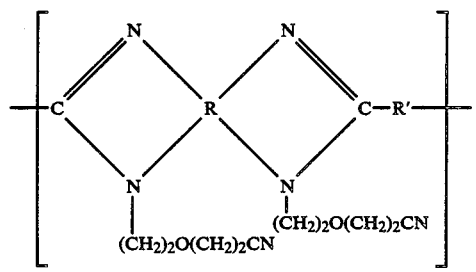

The acrylonitrile which is employed in this reaction is represented by the general formula of:

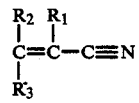

wherein $R_1$ represents a monovalent member selected from the group consisting of hydrogen, $C_1$ to $C_{20}$ substituted or unsubstituted alkyl or substituted or unsubstituted aryl groups, wherein the substituents are selected from the group consisting of methyl, ethyl, cyano or halo substitutents; $R_2$ and $R_3$ represent monovalent members selected from the group consisting of hydrogen and $C_1$ to $C_6$ substituted or unsubstituted alkyl groups, wherein the substitutents are selected from the group consisting of methyl, ethyl or halo group; and wherein $R_1$, $R_2$ and $R_3$ may be the same as or different from each other. Although $R_1$ may be virtually any alkyl member, it is important that its structure not interfere with the reaction of the acrylonitrile with the hydroxyethyl polybenzimidazole polymer anion. In a preferred embodiment, $R_1$, $R_2$ and $R_3$ are hydrogen, methyl or ethyl groups and, in a more preferred embodiment, the acrylonitrile is unsubstituted.

At least a stoichiometric concentration of the acrylonitrile is added to the hydroxyethyl polybenzimidazole anion solution. In a preferred embodiment, the ratio of each acrylonitrile unit to each hydroxyethyl polybenzimidazole polymer anion ranges from about 1:1 to about 5:1. Greater amounts of acrylonitrile may be used, with the only limitation being the solubility of the acrylonitrile in the hydroxyethylated polybenzimidazole anion solution. By using greater quantities of acrylonitrile, up to a ratio of about 10 to 1, the degree of substitution of the available hydroxyethyl anion sites will be virtually complete. In a more preferred embodiment, the ratio of acrylonitrile to each polybenzimidazole hydroxyethyl anion site ranges from about 2:1 to about 5:1.

Since acrylonitriles are generally liquid at room temperature, they may be added dropwise directly to the hydroxyethylated polybenzimidazole anion solution or, to prevent localized precipitation of the cyanoethyl hydroxyethylated polybenzimidazole polymer, the acrylonitrile can be diluted using any reasonable quantity (ratios of acrylonitrile to solvent, from about 0.3 to 1 to about 2 to 1) of the solvent used to prepare the hydroxyethylated polybenzimidazole solvent solution. Following mixture, the acrylonitrile solvent solution may be directly added dropwise to the reaction vessel.

After the acrylonitrile is added, the reaction vessel is heated to a temperature ranging from about 35° C. to about 80° C. for a period from about 1 hour to about 24 hours. It has been found that by increasing the temperature and time of reaction, the degree of substitution is also increased. However, increasing the temperature of the reaction vessel above the boiling point of the acrylonitrile should be avoided. In a preferred embodiment, by reacting unsubstituted acrylonitrile with hydroxyethylated polybenzimidazole anions in solvent solution for a period of about 10 to about 20 hours at a temperature of about 55° C. to about 75° C., substitutions at the hydroxyethyl sites on the hydroxyethylated polybenzimidazole anion of at least about 50 percent are achieved. By increasing the temperature and time of the reaction and the quantity of available acrylonitrile, within the previously defined limits, even higher percentages of substitution can be achieved.

The cyanoethyl hydroxyethylated polybenzimidazole polymer can be precipitated from the reaction solution by adding to the reaction vessel quantities in excess of a stoichiometric concentration, when compared to the total reaction solution, of a non-solvent for the cyanoethyl hydroxyethylated polybenzimidazole polymer, such as water. The precipitated polymer is then filtered and washed with a non-solvent for the cyanoethylated hydroxyethylated polybenzimidazole polymer, such as acetone or water, to remove any excess solvent from the precipitate.

The cyanoethyl hydroxyethylated polybenzimidazole polymer produced by this process has a wide range of uses, particularly in the separatory field. Membranes, fibers or films made from highly substituted derivatives of hydroxyethylated polybenzimidazole polymer resist chemical reaction. Also, the polymers may be formed into a separatory device to separate the components of a solution by well-known techniques, such as reverse osmosis or ultrafiltration.

The following examples are given as specific illustrations of the invention. All parts and percentages are by weight unless otherwise stated. It is understood, however, that the invention is not limited to the specific details set forth in these examples.

EXAMPLE 1

A polybenzimidazole starting solution was prepared by stirring 15 grams of poly-2,2'-(m-phenylene)-5,5'-bibenzimidazole polymer in particulate form, with 85 grams of N,N-dimethylacetamide and 1.7 grams of lithium chloride for five hours under argon gas in a 1000 ml stainless steel Hoke bomb at 230° C. The solution was then filtered to remove any residual solids. The solution was transferred to a three necked, round bottom flask, fitted with a reflux condenser, a mechanical stirrer, and a thermometer, and 7.8 grams of 98 percent pure ethylene carbonate were added. The reaction flask was heated to 145° C. and held at that temperature for 6 hours. The solution was then cooled to room temperature and added to 200 grams of acetone to precipitate out the resultant solids, which were then air dried. Analysis disclosed the presence of 18.1 grams of hydroxyethylated polybenzimidazole, with a percentage of substitution of about 75 percent.

EXAMPLE 2

To a round bottom reaction flask were added 10.1 grams of a 75.0 percent substituted hydroxyethylated poly-2,2-(m-phenylene)-5,5'-bibenzimidazole produced in Example 1 which is dissolved in 90 grams of N-methyl-2-pyrrolidone and 1.5 grams of benzyl trimethyl ammonium hydroxide mixed with 10 grams of N-methyl-2-pyrrolidone. After one hour of mixing the reactants at room temperature, 11.7 grams of acrylonitrile, which was diluted by an equal quantity of N-methyl-2-pyrrolidone, were added by addition funnel. The reaction flask was heated to 55° C. and allowed to react for 24 hours. A 2 gram sample was removed from the reaction flask, precipitated by the addition of an equal quantity of water and was then washed with water. The precipitant, which was analyzed by nuclear magnetic resonance spectroscopy, showed that the cyanoethylated radical had been substituted on 50 percent of the available hydroxyethyl sites on the polybenzimidazole polymer and no substitution had occurred at any unoccupied imidazole hydrogen sites.

EXAMPLE 3

A polybenzimidazole starting solution was prepared by stirring 15 grams of poly-2,2'-(m-phenylene)-5,5'-bibenzimidazole polymer in particulate form, with 85 grams of N,N-dimethylacetamide and 1.7 grams of lithium chloride for five hours under argon gas in a 1000 ml stainless steel Hoke bomb at 230° C. The solution was then filtered to remove any residual solids. The solution was transferred to a three neck, round bottom flask, fitted with a reflux condenser, a mechanical stirrer, and a thermometer, and 6.4 grams of 98 percent pure ethylene carbonate were added. The reaction flask was heated to 145° C. and held at that temperature for 6 hours. The solution was then cooled to room temperature and added to 200 grams of acetone to precipitate out the resultant solids, which were then air dried. Analysis disclosed the presence of 17.6 grams of hydroxyethylated polybenzimidazole, with a percentage of substitution of about 62.5 percent.

EXAMPLE 4

To a round bottom reaction flask were added 11.33 grams of the 62.5 percent substituted, hydroxyethylated poly,2,2-(m-phenylene)-5,5-bibenzimidazole produced in Example 3 dissolved in 105 grams of N-methyl-2-pyrrolidone; and 1.4 grams of benzyl trimethyl ammonium hydroxide which was diluted to 40 percent by weight in methanol. After 25 minutes of mixing the reactants at room temperature, 8.6 g rams of acrylonitrile mixed with 10 grams of N-methyl-2-pyrrolidone were placed in an addition funnel and slowly added to the reaction vessel over a period of 25 minutes. The reaction vessel was stirred at a temperature of 25° C. for abqut 4 hours. The temperature was then increased to 35° C. and held at that temperature for an additional 4 hours, the temperature was then increased to 45° C. and held at that temperature for an additional 3 hours and finally the temperature was increased to 55° C. and held at that temperature for an additional 15 hours. A 2 gram sample from the reaction flask was precipitated by the addition of 5 grams of acetone, washed with 10 grams of water for each reaction condition. The resulting precipitate was analyzed by nuclear magnetic resonance spectroscopy which disclosed 20, 25, 35 and 35 percent substitution on the available hydroxyethyl sites by the cyanoethyl substituent and no substitution on the unsubstituted imidazole hydrogen sites of the polybenzimidazole polymer.

As can be seen, the reaction of the hydroxyethylated polybenzimidazole with acrylonitrile in the presence of a base produces high percentages of substitution of a cyanoethyl derivative of hydroxyethylated polybenzimidazole polymer. These polymers can be formed into films, fibers and other products of great utility which are highly resistant to chemical reaction.

I claim:

1. A process for preparing a derivative of hydroxyethylated polybenzimidazole which comprises the steps of:
   a. preparing an N-substituted hydroxyethylated polybenzimidazole polymer solvent solution wherein at least 40 percent of the imidazole hydrogen sites are hydroxyl substituted;

b. mixing a base with the solution to form an N-substituted hydroxyethylated polybenzimidazole anion; and c. reacting the N-substituted hydroxyethylated ion with an acrylonitrile to produce an N-substituted cyanoethyl hydroxyethylated polybenzimidazole polymer.

2. A process for preparing a derivative of hydroxyethylated polybenzimidazole which comprises the steps of:

a. preparing an N-substituted hydroxyethylated polybenzimidazole solvent solution wherein at least 40 percent of the imidazole hydrogen sites are hydroxyl substituted and wherein about 1 to about 35 percent of the solution by weight is comprised of the 40 percent substituted hydroxyethylated polybenzimidazole polymer;

b. mixing with the solution about 1 to about 15 percent by weight of a base with a pka of at least about 9 to form an N-substituted hydroxyethylated polybenzimidazole anion; and c. reacting with the N-substituted hydroxyethylated polybenzimidazole ion at least a stoichiometric concentration of an acrylonitrile to produce an N-substituted cyanoethyl hydroxyethylated polybenzimidazole polymer.

3. A process for preparing a derivative of hydroxyethylated polybenzimidazole which comprises the steps of:

a. preparing an N-substituted hydroxyethylated polybenzimidazole polymer solvent solution wherein at least 40 percent of the imidazole hydrogen sites are hydroxyl substituted and wherein about 5 to about 20 percent of the solution by weight of the solution is comprised of the 40 percent N-substituted hydroxyethylated polybenzimidazole polymer;

b. mixing with the solution about 1 to about 8 percent by weight of a quaternary ammonium hydroxide to form an N-substituted hydroxyethylated polybenzimidazole anion; and c. reacting with the N-substituted hydroxyethylated polybenzimidazole ion an unsubstituted acrylonitrile in a ratio of about 1:1 to about 5:1 acrylonitrile unit to each N-substituted hydroxyethylated polybenzimidazole ion, to produce an N-substituted cyanoethyl hydroxyethylated polybenzimidazole polymer.

4. The process as in any of claims 1, 2 or 3 wherein the N-substituted hydroxyethylated polybenzimidazole starting material is characterized by recurring monomeric units of:

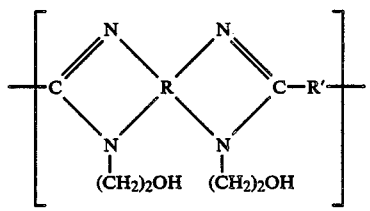

wherein R is a divalent aromatic nucleus with the nitrogen atoms forming benzimidazole rings being paird upon adjacent carbon atoms, and R' is the divalent substitute selected from aliphatic, alicyclic or aromatic radicals containing between about 2-20 carbon atoms.

5. The process as in any of claims 1, 2 or 3 wherein the N-substituted hydroxyethylated polybenzimidazole polymer starting material is comprised of recurring monomeric units of:

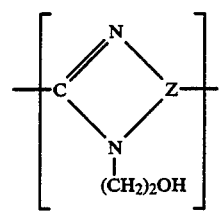

wherein Z is an aromatic nucleus having the nitrogen atom forming the benzimidazole ring paired upon adjacent carbon atoms of the aromatic nucleus.

6. The process as in any of claims 1, 2 or 3 wherein the N-substituted hydroxyethylated polybenzimidazole polymer is hydroxyethylated poly-2,2-(m-phenylene)-5,5'-bibenzimidazole.

7. The process of claim 1 wherein the concentration of the N-substituted hydroxyethylated polybenzimidazole polymer in the solvent solution is from about 1 to about 35 percent by weight based on the total weight of the solution.

8. The process as in any of claims 1 or 2 wherein the concentration of the N-substituted hydroxyethylated polybenzimidazole in the solvent solution is in the range of about 5 to about 20 percent by weight based on the total weight of the solution.

9. The process as in any of claims 1, 2 or 3 wherein at least about 50 percent of the available hydroxyethyl groups on the N-substituted hydroxyethylated polybenzimidazole polymer are cyanoethylated.

10. The process as in any of claims 1, 2 or 3 wherein the solvent capable of dissolving the N-substituted hydroxyethylated polybenzimidazole is selected from the group consisting of N,N-dimethylaceamide, N,N-dimethylformamide, dimethylsufloxide and N-methyl-2-pyrrolidone.

11. The process of claim 10 wherein the solvent for the solvent solution is N-methyl-2-pyrrolidone.

12. The process as in any of claims 1 or 2 wherein the base is an organic base having a pka of at least about 9 and is selected from the group consisting of hydrides, aloxides, organometallic bases, amides, or quaternary ammonium hydroxides.

13. The process of claim 1 wherein the base is a quaternary ammonium hydroxide.

14. The process of claim 1 wherein the base is mixed with the N-substituted hydroxyethylated polybenzimidazole polymer solution for a period of about 1 to about 5 hours.

15. The process as in any of claims 1, 2 or 3 wherein the acrylonitrile is represented by the formula:

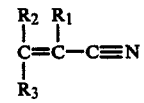

wherein $R_1$ is a monovalent member selected from the group consisting of hydrogen, $C_1$ to $C_{20}$ substituted or unsubstituted alkyl and substituted or unsubstituted aryl group, wherein the substituent are selected from the group consisting of methyl, ethyl, cyano or halide substituents; wherein $R_2$ or $R_3$ are monovalent members selected from the group consisting of hydrogen, and $C_1$ to $C_6$ substituted or unsubstituted alkyl members and wherein $R_1$, $R_2$ and $R_3$ are the same as or different from each other.

16. The process of claim 15 wherein the acrylonitrile is selected from the group consisting of methyl acrylonitrile and ethyl acrylonitrile.

17. The process of claim 15 wherein the acrylonitrile is unsubstituted acrylonitrile.

18. The process of claim 1 wherein at least a stoichiometric concentration of the acrylonitrile is reacted with the N-substituted hydroxyethylated polybenzimidazole ion.

19. The process as in any of claims 1 or 2 wherein the ratio of the acrylonitrile units to each N-substituted hydroxyethyl polybenzimidazole ion site is from about 2:1 to about 5:1.

20. The process as in any of claims 1, 2 or 3 wherein the reaction of the N-substituted hydroxyethylatd polybenzimidazole with the acrylonitrile is conducted at a temperature of from about 35° C. to about 80° C.

21. The process as in any of claims 1, 2 or 3 wherein the reaction between the N-substituted hydroxyethylated polybenzimidazole mixture and the acrylonitrile is conducted for a period of about one hour to about 24 hours.

22. An N-substituted cyanoethyl derivative of N-substituted hydroxyethylated polybenzimidazole polymer.

23. The N-substituted cyanoethyl derivative of hydroxyethylated polybenzimidazole polymer produced by the process of claim 1.

24. The N-substituted cyanoethyl derivative of hydroxyethylated polybenzimidazole polymer produced by the process of claim 2.

25. The N-substituted cyanoethyl derivative of hydroxyethylated polybenzimidazole polymer produced by the process of claim 3.

* * * * *